United States Patent
Stoltenhoff et al.

(10) Patent No.: US 6,234,550 B1
(45) Date of Patent: May 22, 2001

(54) PICK-UP APPARATUS FOR RETRIEVING AND DEPOSITING A LOAD

(75) Inventors: Karl-Wilhelm Stoltenhoff, Wetter; Uwe Schatz, Herdecke; Christian Von Schneidemesser, Essen, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/274,420

(22) Filed: Mar. 22, 1999

(30) Foreign Application Priority Data

Apr. 17, 1998 (DE) .............................................. 198 17 935

(51) Int. Cl.$^7$ ........................................................ B25J 15/08
(52) U.S. Cl. ..................... 294/119.1; 294/902; 414/751.1
(58) Field of Search ................. 294/86.4, 87.1, 294/88, 119.1, 902; 414/277, 280, 331.01, 736, 741, 751.1; 901/36–39

(56) References Cited

U.S. PATENT DOCUMENTS

| | | |
|---|---|---|
| 2,740,540 | 4/1956 | Lindsey . |
| 2,921,701 | 1/1960 | Ireland . |
| 4,284,381 * | 8/1981 | Minato ........................ 414/751.1 X |
| 4,305,692 * | 12/1981 | Brauer ......................... 294/119.1 X |
| 4,735,452 * | 4/1988 | Nemoto ............................. 294/119.1 |
| 5,271,706 * | 12/1993 | Helbach et al. .............. 414/751.1 X |
| 5,449,262 * | 9/1995 | Anderson et al. ............ 294/119.1 X |
| 5,588,688 * | 12/1996 | Jacobsen et al. ................ 294/902 X |

FOREIGN PATENT DOCUMENTS

| | | |
|---|---|---|
| 33 24 349 C1 | 11/1984 | (DE) . |
| 91 01 201 U | 2/1992 | (DE) . |
| 44 25 127 A1 | 1/1996 | (DE) . |
| 196 13 707 A1 | 10/1997 | (DE) . |
| 0 733 563 | 9/1996 | (EP) . |
| 2 246 119 | 1/1992 | (GB) . |

* cited by examiner

*Primary Examiner*—Johnny D. Cherry
(74) *Attorney, Agent, or Firm*—Henry M. Feiereisen

(57) ABSTRACT

Apparatus for retrieving and depositing a load, in particular to and from racks, includes a pair of elongated guides in parallel relationship and a grabbing device having at least two grippers movably guided in the elongated guides for traveling in a horizontal plane in an operating direction from a ready position into an operative position in which the grippers are positioned on both sides of the load substantially parallel to the sides of the load. Each of the grippers has at least one plate-shaped gripping area, with the gripping area of one gripper confronting the gripping area of the other gripper, and with the gripping areas of the grippers extending parallel to one another. Operatively connected to the elongated guides is a force-applying unit for moving the guides in synchronism relative to one another to thereby urge the grippers against the sides of the load.

17 Claims, 3 Drawing Sheets

PICK-UP APPARATUS FOR RETRIEVING AND DEPOSITING A LOAD

CROSS-REFERENCES TO RELATED APPLICATIONS

This application claims the priority of German Patent Application Serial No. 198 17 935.9, filed Apr. 17, 1998, the subject matter of which is incorporated herein by reference.

BACKGROUND OF THE INVENTION

The present invention relates, in general, to an apparatus for retrieving and depositing a load, e.g. from a rack or onto a rack, and more particularly to a load pick-up apparatus of a type having a grabbing device with grippers moveably guided in parallel elongated guides for travel in a horizontal plane into an operative position in which the grippers are positioned on both sides next to confronting side walls of the load, and urged into engagement with the confronting side walls.

German Pat. No. DE 196 13 707 describes an apparatus which includes lance-like grippers for retrieving and depositing load units, whereby the grippers can be moved in a horizontal plane for disposition on both sides next to the side walls of the load unit. The grippers are guided in elongated guides and pivoted in synchronism in opposite direction into a clamped engagement with the side walls of the load unit. After effecting the clamped engagement with the load unit, the load can be retrieved by retracting the grippers to thereby remove the load unit form the storage area. A depositing of the load unit for storage is effected in analogous fashion.

A drawback of this conventional grabbing device is the relative small contact area of the grippers so that the grippers may cause damage to the load, in particular when cardboard boxes are involved. Moreover, the effective contact pressure applied by the grippers must be sufficiently great to ensure a safe removal and storage even when the load unit is charged.

SUMMARY OF THE INVENTION

It is thus an object of the present invention to provide an improved apparatus for picking up and depositing a load, obviating the afore-stated drawbacks.

In particular, it is an object of the present invention to provide an improved load pick-up and depositing apparatus which operates at relatively small contact pressure while still assuring a secure retrieval and placement of the load, without damage to the container.

These objects, and others which will become apparent hereinafter, are attained in accordance with the present invention by providing a pair of elongated guides in parallel disposition, and a grabbing device with at least two grippers which are movably guided in the guides for travel in an operating direction from a ready position to an operative position in which the grippers are disposed on both sides of the load substantially parallel to the sides of the load, with each gripper having at least one plate-shaped gripping area, with the gripping areas of both grippers opposing one another in parallel relationship and in substantial parallel relationship with respect to the side walls of the load unit, and whereby the elongated guides are movable in synchronism toward one another to thereby force the grippers into engagement against the sides of the load unit.

The grabbing device according to the present invention has grippers which are forced in parallel alignment against the load and thus can be designed with a sufficiently large gripping area that enables to keep the contact pressure relatively small while still assuring good gripping behavior of the grippers. Moreover, as the synchronized movement of the grippers is realized via the elongated guides the load unit can be securely grabbed, even when the load unit is misaligned to a certain extent.

Suitably, the gripping area of the grippers may have a roughened surface to realize a better force fit. The gripping action can be further enhanced, in particular when soft containers are involved, by providing the gripping area of the grippers with serrated vertical indentations.

According to another feature of the present invention, each gripper has two plate-shaped vertical bearing surfaces which extend perpendicular to the gripping area in the direction of the opposite gripper and face away from one another. Thus, the load unit rests against the confronting one of the bearing surfaces, to thereby ensure, in particular during placement for storage, a secure shifting of the load unit into a proper position.

According to still another feature of the present invention, each gripper has at least one further gripping area, with the bearing surfaces of each gripper defining in the operating direction a leading bearing surface, whereby one of the gripping areas is positioned in the operating direction ahead of the leading bearing surface. In this manner, two racks in confronting parallel disposition can be loaded and unloaded, without requiring any complex maneuvers, as it is only necessary to reverse the operating direction, i.e. the leading bearing surface in one operating direction becomes the trailing bearing surface in the other operating direction, and vice versa. This configuration ensures that in either operating direction, a bearing surface engages the load unit being maneuvered.

It is also possible to provide two gripping areas ahead of and behind the bearing surfaces to better conform the pick-up apparatus to different packagings, such as plastic containers or cardboard boxes. Suitably, the two gripping areas are arranged in succession when viewed in the operating direction to thereby ensure a trouble-free operation during loading for storage and retrieval. In order to realize a safe grabbing of plastic containers as well as cardboard boxes, one of the two gripping areas has serrated vertical indentations and the other gripping area has a roughened surface. Suitably, the serrated gripping area has a thickness which is smaller than the thickness of the roughened gripping area. In this manner, different strength properties of the load units are taken into account.

According to another feature of the present invention, the gripping area of each gripper may have arranged thereon at least one arbor-like projection which extends perpendicular to the gripping area toward the opposing gripper, to thereby realize a secure grabbing even when cardboard boxes are handled. Suitably, the arbor has a length which is greater than the thickness of the roughened and serrated gripping areas.

According to yet another feature of the present invention, a synchronized motion of the elongated guides can be realized via an interconnecting spindle which is driven by a motor and has opposite ends which are rotatably supported in the elongated guides. Suitably, the drive for the spindle is operatively connected to one spindle end, while the other spindle end is received in a spindle nut which is securely fixed in the associated elongated guide. The drive may be a servomotor for cost-saving purposes. The contact pressure of the grippers upon the load unit may be restricted to a maximum value by automatically stopping operation of the servomotor when a predetermined motor current value is exceeded.

A synchronized movement of the elongated guides can be realized in a simple manner by providing a double lever which is rotatably supported in a frame at a central location with respect to the elongated guides and hingedly connects the elongated guides to one another.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
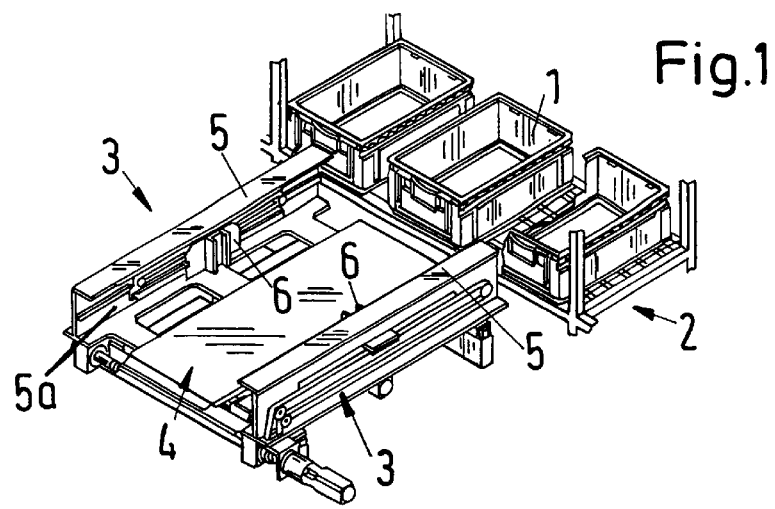
FIG. 1 is a top and side perspective view of an apparatus for retrieving and depositing a load, illustrating a grabbing device in ready position and equipped with a gripper of simplified configuration.

Throughout all the Figures, same or corresponding elements are generally indicated by same reference numerals.

Turning now to the drawing, and in particular to FIG. 1, there is shown a top and side perspective view of an apparatus for retrieving and depositing a load, including a grabbing device, generally designated by reference numeral 4. In FIG. 1, the grabbing device 4 occupies a ready position before withdrawal of a load unit, such as container 1, from a rack 2. The grabbing device 4 includes two elongated guides 5 which are of substantial C-shaped configuration to define a longitudinal groove 5a. The elongated guides 5 are mounted on a frame 20 (FIG. 4) in parallel relationship in a horizontal plane. Each of the elongated guides 5 accommodates in the anchoring groove 5a a gripper 6 which, for sake of simplicity, is shown by way of a simplified configuration to describe the principal mode of operation of the load retrieving and depositing apparatus. Both grippers 6 are guided in the elongated guides 5 for travel in synchronism by means of a belt drive, generally designated by reference numeral 3, which includes a driveshaft (not shown) extending transversely to the guides 5 and has a variable length in a manner known per se. The grippers 6 of both guides 5 oppose one another and occupy the ready position in FIG. 1.

Figure 2:
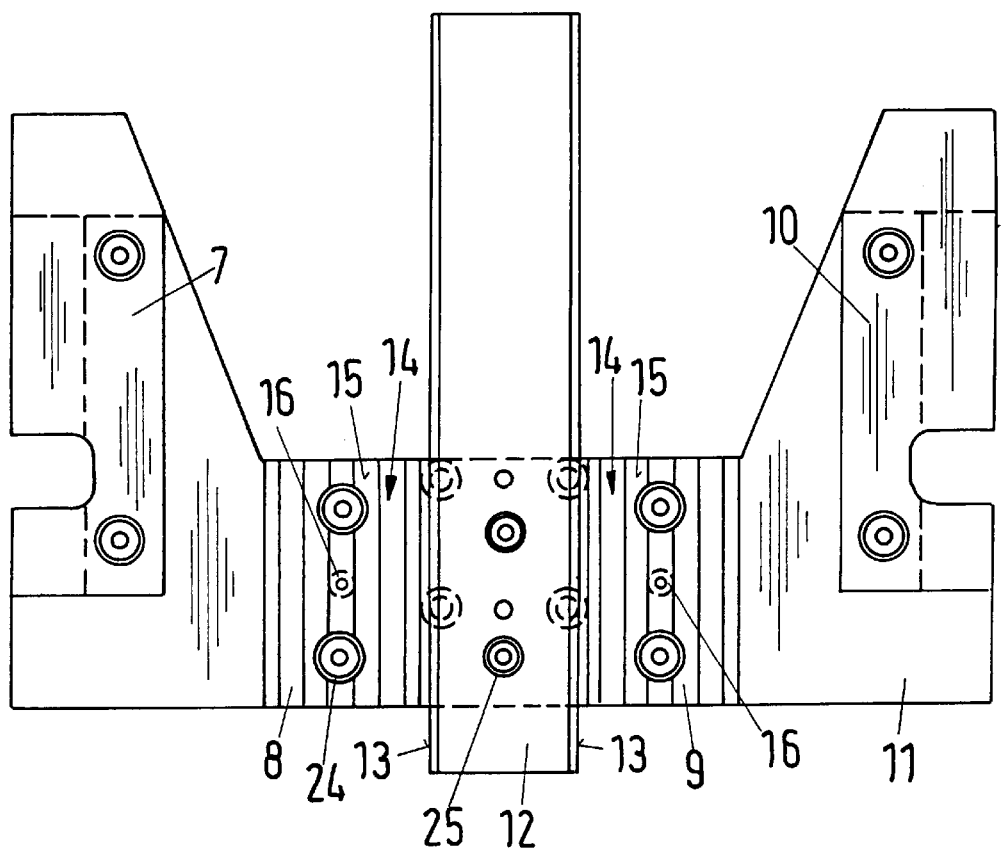
FIG. 2 is a side plan view of an improved configuration of a gripper according to the present invention, for use in the apparatus of FIG. 1.

Turning now to FIG. 2, there is shown a side plan view of a novel and inventive gripper 6 according to the present invention for use in the apparatus of FIG. 1. The gripper 6 has a base plate 11 which has arranged thereon a total of four plate-shaped gripper areas 7, 8, 9, 10 disposed in a row behind one another and secured by suitable bolts 24 to the base pate 11. Secured by bolts 25 perpendicular to the base plate 11 is a vertical bearing plate 12 which separates two gripping areas 7, 8 to the left thereof from two gripping surfaces 9, 10 to the right thereof in the illustration of FIG. 2. The bearing plate 12 defines two vertical bearing surfaces 13 which face away from one another and extend perpendicular to the gripping areas 7, 8, 9, 10.

Figure 3:
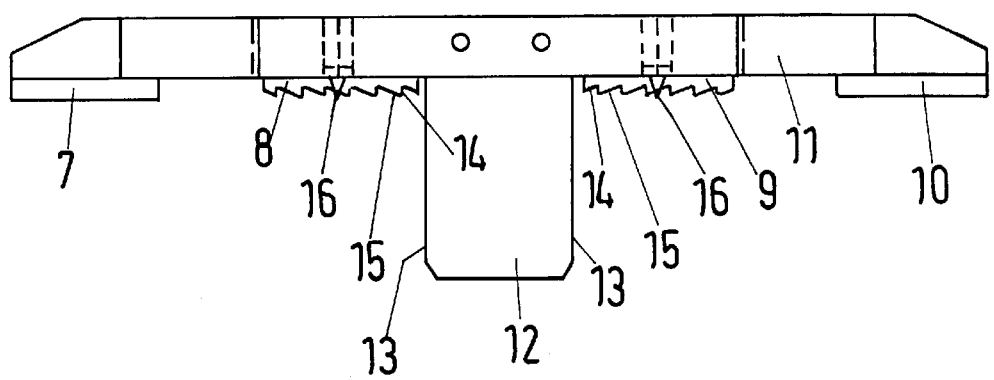
FIG. 3 is a top plan view of the gripper of FIG. 2.

As shown in particular in FIG. 3, the gripping areas 8 and 9 which are positioned adjacent the bearing surfaces 13 on either side of the bearing plate 12 are formed with serrated vertical indentations while the gripping areas 7 and 10 that are further distant to the bearing plate 12 have a roughened surface.

Each saw tooth of the serrated gripping areas 8, 9 has a vertical flank 14, which extends perpendicular to the base plate 11, and a vertical flank 15 which extends slantingly to the base plate 11, thereby forming the particular configuration of each saw tooth. FIG. 3 further illustrates the provision of an arbor 16 on both sides of the bearing plate 12, with the arbors 16 of one gripper 6 extending in the direction toward the other opposite gripper 6.

The gripping areas 7, 10 and the gripping areas 8, 9 have different thickness. More specifically, the thickness of the gripping areas 7, 10 is greater by about 1 millimeter than the thickness of the gripping areas 8, 9. In the description, the term "thickness" in conjunction with the gripping areas 8, 9 denotes the radial distance or depth of the saw teeth between the tip and bottom. As shown in FIG. 3, the arbors 16 have a length which is greater than the thickness of the gripping areas 7, 10 by approximately one millimeter. Thus, the tips of the serrated gripping areas 8, 9 project the least into the space between the two confronting grippers 6. The gripping areas 7, 10 and 8, 9 of each gripper 6 extend also in a common vertical plane.

By configuring the gripping areas 7, 8, 9, 10 of different thickness and by selecting the length of the arbors 16 accordingly, the grabbing device 4 can be best suited to different load units, in particular when different materials are used for the containers 1. Thus, the serrated gripping areas 8, 9 are effective, for example, only for cardboard boxes or the like, while the arbors 16, on the other hand, always contribute to the gripping action.

Figure 4:
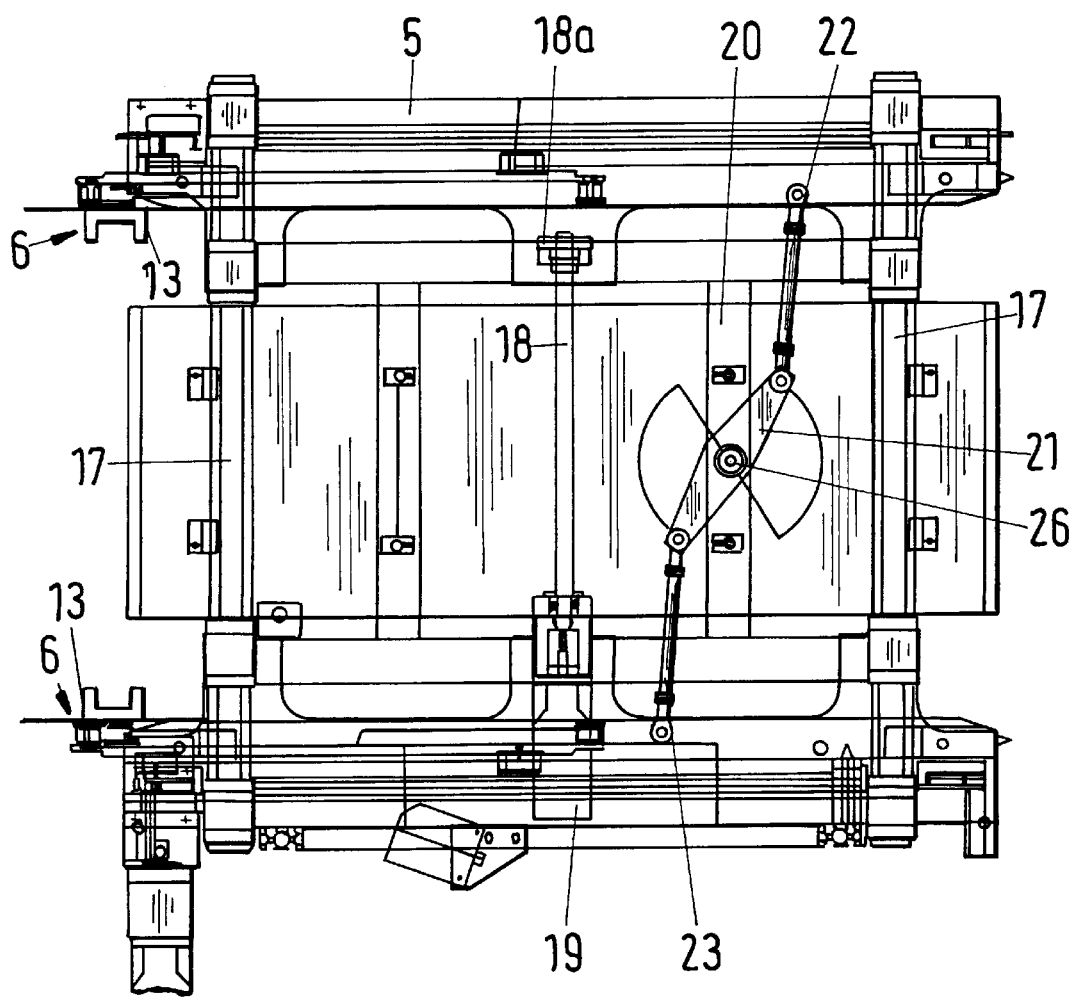
FIG. 4 is a top plan view of the grabbing device of FIG. 1.

Turning now to FIG. 4, there is shown a top plan view of the grabbing device 4 of FIG. 1, with the grippers 6 exhibiting again the simplified configuration for ease of illustration and including only one exemplified gripping area neighboring the bearing surfaces 13. Both elongated guides 5 are slidably mounted on crossbars 17 which extend transversely to the guides 5, and interconnected by a spindle 18. One end of the spindle 18 is driven by a servomotor 19 and freely rotatably supported on this side to the associated guide 5. The other opposite end of the spindle 18 is rotatably mounted to a spindle nut 18a which is in fixed rotative engagement with the opposite guide 5. Thus, during operation of the servomotor 19, the guides 5 travel toward one another. In order to realize a synchronized displacement of the guides 5, a double lever 21 is pivotally mounted to the frame in the middle between the guides 5 for rotation about a pivot axis 26. Articulated to one end of the double lever 21 is one end of a tie rod 22 and articulated to the other end of the double lever 21 is one end of a tie rod 23. The other ends of the tie rods 22, 23 are articulated to the guides 5, respectively. The connection system comprised of tie rod 22—double lever 21—tie rod 23 realizes in conjunction with the central frame-mounted pivot point of the double lever 21 a synchronized movement of the guides 5 toward the center and away from the center.

It will be appreciated by persons skilled in the art that the spindle 18 may certainly also be so configured as to have on one side a right-hand thread and on the other side a left-hand thread. In this case, the need for providing the double lever can be eliminated. Also, it is certainly within the scope of the present invention to replace the single spindle with two spindles having separate motors. Moreover, the provision of a spindle for effecting a transverse movement of the guides 5 can be replaced altogether by a suitable belt or chain drive. The transverse drive for the guides 5 may certainly also be realized in a pneumatic fashion.

Figure 5:
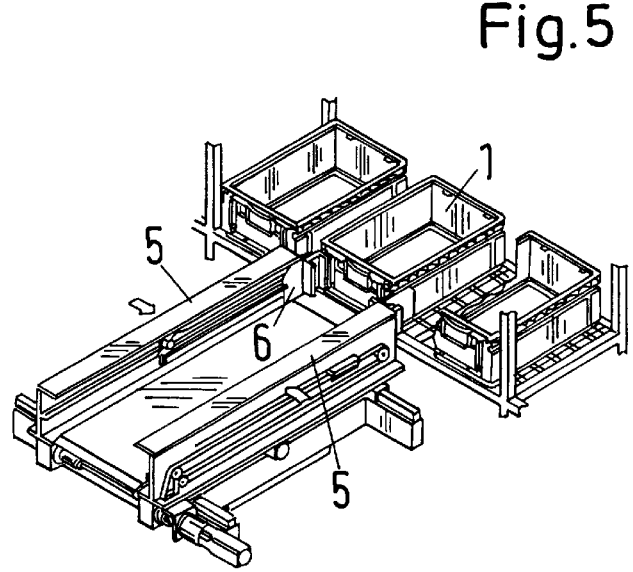
FIG. 5 is a top and side perspective view of the apparatus of FIG. 1, with the grabbing device during an operational phase for retrieving the load from a rack.
Figure 6:
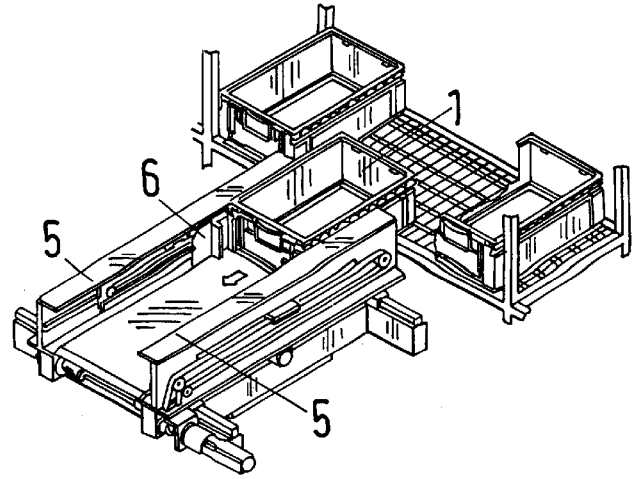
FIG. 6 is a top and side perspective view of the apparatus of FIG. 1, with the grabbing device during the removal phase of the load from the rack.

In FIG. 1, the grabbing device 4 is in the ready position. When desiring to remove a container 1 from the rack 2, the elongated guides 5 are moved by the servomotor 19 toward one another until the guides 5 are positioned at about the width of the container 1 at slight overmeasure of a few centimeters. Subsequently, the grippers 6 are moved in synchronism in direction of the container 1 into the operative end position, as shown in FIG. 5. In this position, the container 1 rests against the leading bearing surfaces 13 of the grippers 6 of the grabbing device 4, with the grippers 6 being so shifted as to project beyond the end face of the grabbing device 4 and partially into the rack 2. When the grippers 6 reach their end position, the elongated guides 5 are moved in synchronism toward one another so that the front gripping areas, i.e. gripping areas 9, 10, of the grippers 6 are moved toward and ultimately bear upon the confronting sides of the container 1. A destruction or damage of the container 1 is precluded when so configuring the servomotor 19 as to automatically stop operation when exceeding a certain motor current value which corresponds to a certain contact pressure. The thus grabbed container 1 is then pulled from the rack 2 by retracting the grippers 6, as shown in FIG. 6.

In order to permit a pre-positioning of the guides 5 with respect to the width of the container 1 before withdrawal thereof, the width of the containers 1 placed in the rack compartments are inputted and stored in an electronic memory. Suitably, the width of the containers 1 is determined before the containers are placed in the rack 2. A control unit for controlling the movement of the guides 5 retrieves these data before removal of a container 1 and is used as presetting for the spacing between the guides 5.

While the invention has been illustrated and described as embodied in a pick-up apparatus for retrieving and depositing a load, it is not intended to be limited to the details shown since various modifications and structural changes may be made without departing in any way from the spirit of the present invention.

What is claimed as new and desired to be protected by Letters Patent is set forth in the appended claims:

1. Apparatus for retrieving and depositing a load, comprising:
   a pair of elongated guides extending in parallel relationship;
   a grabbing device having at least two grippers movably guided in a horizontal plane in the elongated guides for traveling in an operating direction into an operative position in which the grippers are positioned on both sides of a load substantially parallel to the sides of the load, each of the grippers having at least one plate-shaped gripping area, with the gripping area of one gripper confronting the gripping area of the other gripper, and with the gripping areas of the grippers extending parallel to one another; and
   a force-applying means operatively connected to the elongated guides for moving the guides in synchronism relative to one another to thereby urge the grippers against the sides of the load;
   wherein each gripper has two vertical, plate-shaped bearing surfaces facing away from one another and extending perpendicular to the gripping area of the gripper, said bearing surfaces of one of the grippers and said bearing surfaces of the other one of the grippers confronting one another.

2. The apparatus of claim 1 wherein the gripping area of each gripper has a roughened surface.

3. The apparatus of claim 1 wherein the gripping area of each gripper is formed with serrated, vertical indentations.

4. The apparatus of claim 1 wherein each gripper has a further gripping area, said bearing surfaces of each gripper defining in the operating direction a leading bearing surface, with one of the gripping areas being positioned in the operating direction ahead of the leading bearing surface.

5. The apparatus of claim 1 wherein each gripper has four gripping areas, said bearing surfaces of each gripper defining in the operating direction a leading bearing surface and a trailing bearing surface, with a first pair of the gripping areas being positioned in the operating direction ahead of the leading bearing surface and with a second pair of the gripping areas being positioned in the operating direction behind the trailing bearing surface.

6. The apparatus of claim 5 wherein the two gripping areas ahead of the leading bearing surface are arranged behind one another in the operating direction, and the two gripping areas behind the trailing bearing surface are arranged behind one another.

7. The apparatus of claim 5 wherein one of the gripping areas of the first and second pairs of gripping areas has serrated vertical indentations, and the other one of the gripping areas of the first and second pairs of gripping areas has a roughened surface.

8. The apparatus of claim 7 wherein the serrated gripping area has a thickness which is smaller than a thickness of the roughened gripping surface.

9. The apparatus of claim 7, and further comprising at least one arbor arranged at one of the gripping areas of the first and second pairs of gripping areas of the one gripper and extending toward the other, opposite, gripper.

10. The apparatus of claim 9 wherein the arbor has a length which is greater than a thickness of the roughened gripping area.

11. The apparatus of claim 1 wherein the force-applying means includes a spindle for interconnecting the elongated guides, said spindle having opposite ends, one of the ends of the spindle being rotatably supported in one of the elongated guides, and the other one of the ends of the spindle being rotatably supported in the other one of the elongated guides.

12. The apparatus of claim 11 wherein the force-applying means includes a drive unit operatively connected to one of the ends of the spindle, said force-applying means including a spindle nut for supporting the other one of the ends of the spindle, said spindle nut being securely fixed in the elongated guide associated to the other end of the spindle.

13. The apparatus of claim 12 wherein the drive unit is a servomotor.

14. The apparatus of claim 13 wherein the servomotor is so controlled as to automatically stop operation when exceeding a predetermined motor current value.

15. The apparatus of claim 1, and further comprising a frame for supporting the elongated guides, said force-applying means including a double lever rotatably mounted to the frame at a central location with respect to the elongated guides for hingedly connecting the elongated guides to one another.

16. The apparatus of claim 1 wherein the force-applying means urge the grippers against the sides of the load at a maximum contact pressure which is commensurate with a material strength of the load.

17. The apparatus of claim 16 wherein the force-applying means is so configured that the maximum contact pressure correlates to a predetermined motor current so that operation of the force-applying means is automatically stopped when the predetermined motor current is exceeded.

* * * * *